United States Patent [19]
Botkin

[11] 3,967,746
[45] July 6, 1976

[54] CANNING CLOSURE AND METHOD

[76] Inventor: Albert L. Botkin, 3018 Hood Ave., Chicago, Ill. 60645

[22] Filed: Apr. 28, 1975

[21] Appl. No.: 572,160

[52] U.S. Cl................................. 215/260; 215/271; 215/348; 426/118; 426/395; 426/407
[51] Int. Cl.²........................................ B65D 51/16
[58] Field of Search .......... 426/118, 131, 395, 407; 215/230, 260, 261, 262, 270, 271, 276, 307

[56] References Cited
UNITED STATES PATENTS

| | | | |
|---|---|---|---|
| 1,160,597 | 11/1915 | Hammer | 215/276 |
| 1,692,634 | 11/1928 | Doweiko | 215/331 |
| 1,877,258 | 9/1932 | Spahn | 215/262 |
| 2,032,931 | 3/1936 | Gibbs | 215/260 |
| 2,046,227 | 6/1936 | White | 215/262 |
| 2,449,014 | 9/1948 | Shaffer | 215/260 |
| 3,152,711 | 10/1964 | Mumford | 215/271 |
| 3,160,302 | 12/1964 | Chaplin | 215/271 |
| 3,373,889 | 3/1968 | Giles | 215/276 X |
| 3,393,818 | 7/1968 | McIntosh | 215/260 |
| 3,471,051 | 10/1969 | Cistone | 215/260 |
| 3,589,545 | 6/1971 | Carpenter | 215/260 |

FOREIGN PATENTS OR APPLICATIONS

| | | | |
|---|---|---|---|
| 236,093 | 10/1959 | Australia | 215/348 |
| 1,084,564 | 9/1967 | United Kingdom | 215/261 |
| 472,427 | 9/1937 | United Kingdom | 215/260 |

Primary Examiner—Donald F. Norton
Attorney, Agent, or Firm—Dressler, Goldsmith, Clement & Gordon, Ltd.

[57] ABSTRACT

A one-piece reusable closure for home canning. The closure is adapted for sealing home canning containers, such as "Mason Jars." The closure has a one-piece threaded cap with a bonded annular closed-cell foam gasket at the periphery of the central cover panel positioned to seal against the jar lip. A central cover portion is dished outwardly and moves to an inwardly dished configuration when vacuum is developed in the container. When the closure is unscrewed, the central panel portion springs with an audible click to the outwardly dished configuration. Limiting projections extending downwardly into the gasket bear and compress the gasket material against the lip of the jar to control tightening of the closure on the jar so that, when the jar contents are heated, gases will be vented under the circumferentially spaced portions of the gasket. The closure may be initially fully tightened and need not be further tightened after heating and subsequent cooling of the jar to maintain the seal and vacuum within the container.

12 Claims, 7 Drawing Figures

CANNING CLOSURE AND METHOD

This invention relates to an improved closure for food containers, and particularly to those used for the home canning of foods, and to a method of canning using that closure.

Many types of containers and closures for the home canning of food products have been developed over the years. For many years, the most prevalent home canning medium in the United States has been the so-called "Mason Jar." Such a medium usually comprises a glass container having a standardized external thread on the periphery of the mouth and a suitable cap or closure assembly. Most recently, a widely used two-piece closure assembly has comprised a dished, disc-shaped central cover panel having an annular gasket formed at its periphery on one surface and a threaded peripheral portion. The threaded peripheral portion has a depending skirt or flange with a suitable thread, cooperable with the glass container thread, and an annular shoulder adapted to overlie the upper periphery of the gasketed central cover panel. The threaded peripheral portion is usually loosely threaded on the container after the central cover panel has been positioned over the mouth and prior to heating. When the cover panel is of the dished type, as the container cools, the panel snaps into an inwardly dished position. When the container cools, the threaded peripheral portion is finally tightened to retain the gasketed central cover panel in its sealing relationship with the mouth of the glass container. Other systems for sealing home canning containers have used separate rubber sealing gaskets or rings, and the like.

All of the various media and methods for sealing home canning containers have one or more drawbacks. Some systems, as pointed out, require separate and separable sealing elements, such as rubber gaskets or rings. Others require elaborate positive locking mechanisms. The most commonly used system usually requires the use of an implement to remove the sealed central cover panel from a container. Such removal damages the gasketed central cover panel and therefore requires it to be discarded after a single use.

In accordance with this invention a one-piece, reusable closure for home canning containers is provided. It effectively seals the container, prevents blow-out of the gasketing material under rapid decompression and provides a positive visual indication that vacuum has been maintained in the container. In its preferred form, the maintenance of the vacuum is indicated not only visually, but also audibly upon the opening of the sealed container. An additional safety feature provided in accordance with this invention is the presence of limitor means for controlling the degree to which the closure may readily be tightened on the glass container. With prior art closures such as the two-piece closure assembly referred to earlier, the threaded peripheral portion is usually left loose enough so that, as the contents are heated, venting of gases may take place under the gasket. Thereafter, as the container cools the central cover panel seals against the container lip, following which the threaded peripheral portion is tightened so that when the container is stored, vacuum will be positively maintained. With closures of the preferred embodiment of the present invention, the one-piece closure may be screwed down, as to its final tightness, which is controlled by container engaging limitor means. The gasket and closure configuration is such that the gasket is suitably resilient to compress under excessive internal pressure to allow gases to be vented, as when the container is being heated, and so that when the internal pressure is relieved, the gasket will relax, again to seal against the container lip, thereby to allow the container to maintain an internal vacuum.

A package in accordance with this invention comprises a glass container having a mouth, an upper circumferential sealing lip and a thread and a one-piece closure which is sealingly secured to it. The closure comprises a central cover section terminating outwardly in an integral depending peripheral flange having a thread in threaded engagement with the container thread. An annular gasket formed of a closed-cell foam material is bonded to the closure adjacent the flange, and is in sealing engagement with the lip around its entire edge. A portion of the central cover section is inwardly dished and is maintained in that inwardly dished configuration by internal vacuum in the sealed package. When the closure is unscrewed to gain access to the contents of the container, the central cover portion springs preferentially to an outwardly dished configuration. Preferably limitor means are embedded in the gasket material. The limitor means extend downwardly of the central cover section and locally compress underlying portions of the foam gasket material against the lip more tightly than the gasket material which is circumferentially spaced from the limitor means is compressed. The gasket and limitor means are preferably located in a channel formed in the closure adjacent the peripheral flange.

A method of home canning in accordance with this invention comprises the steps of filling a container with a suitable quantity of product to be canned, threadingly securing a one-piece closure of this invention to the container with the gasket in sealing engagement with the container lip, and then, while heating the container, permitting gases to break the seal between the gasket and the container by compressing the gasket to vent under the gasket to the surrounding atmosphere, and then, while cooling the container, reeffecting the seal between the gasket and the lip without further manipulation of the closure, thereby to allow a vacuum to develop in the container. The central cover section of the closure defines a normally outwardly dished central cover portion and, while a vacuum is developing in the container, the central cover portion is drawn into a downwardly dished configuration, visually to indicate that the container contents are under vacuum.

Further objects, features and advantages of this invention will become apparent from the following description and drawings of which:

Figure 1:
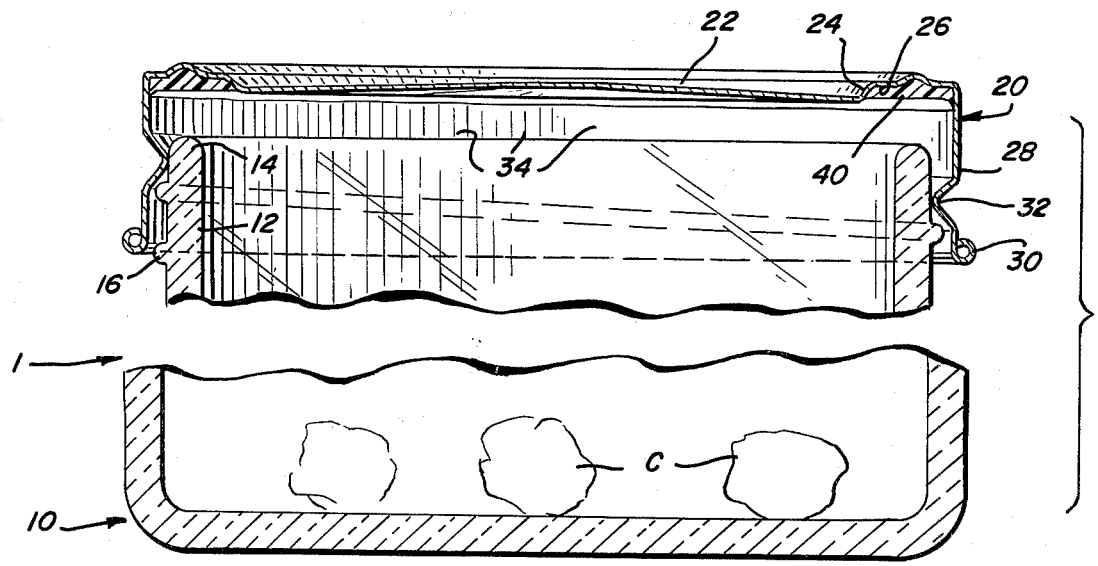
FIG. 1 is a cross-sectional view of a closure and a container, ready to be sealingly secured.

Referring now to the drawings which illustrate a presently preferred embodiment of this invention, a package 1 comprising a glass container 10 proportioned to cooperate with a closure of this invention is provided. Container 10 has a mouth 12 surmounted by an upper, circumferential sealing bead or lip 14. A thread 16 adapted to engage with a complementary closure thread is provided on the container just below the lip 14.

A one-piece closure 20 of this invention is provided for closing mouth 12 via a gasket which sealingly engages lip 14. Closure 20 may preferably be metallic, as of tinplate, and comprises a central panel or cover section 22 which is bounded by an annular shoulder 24. The central panel section defines a central panel portion which is domed or outwardly dished. As will appear, under vacuum the central panel portion (FIG. 4) is drawn into an inwardly dished configuration. When vacuum is relieved, the central portion preferentially springs back to the outwardly dished configuration of FIG. 1. Shoulder 24 borders an inverted, downwardly opening annular gasket receiving channel 26 which terminates at its outer edge in a depending peripheral skirt or flange 28. A rolled edge bead 30 is provided at the lower edge of flange 28. Depending flange 28 is suitably formed, in conventional manner, to provide a thread 32 proportioned to threadingly engage thread 16 of container 10. Although thread 32 is illustrated as a continuous thread, it will be apparent that it may also be a suitable segmental thread of a known type. The uppermost portion of depending flange 28 may be formed with a plurality of corrugations 34 of conventional size and shape to facilitate gripping of the closure for securing it with and for removing it from a container 10.

Channel 26 is filled with a suitable sealing material which serves as a gasket 40. The gasket material is preferably a foamed material of the closed-cell type. It may consist of a polyvinyl chloride plastisol, such as of the type described in U.S. Pat. No. 3,005,433. Such materials may be foamed, as by the addition of a suitable quantity of a gas generating material, such as Nitrosan blowing agent sold by E. I. du Pont de Nemours Co. A suitable Nitrosan may comprise 70% N,N'-dimethyl-N,N'-dinitrosoterephthalamide and 30% white mineral oil, a mixture which liberates nitrogen gas at 100°C. Foamed plastisols of this type have previously been used for closures of different construction than those of the present invention, such as two-piece canning closures of the type referred to above and one-piece closures which are not intended for use as vacuum pack closures.

To provide a suitably bonded gasket, the metal closure is first coated with a suitable primer, following which the plastisol with the added blowing agent is applied, as in an annular pattern. Following its application, the plastisol is heated to expand and cure in situ and to form a strong, secure bond with the closure, thereby integrating it with the one-piece reusable closure of this invention. It has been determined that the volume of plastisol used may be expanded by the blowing agent by from about 10 to about 50 percent, and preferably from about 20 to about 40 percent, thereby to provide a bonded foamed gasket of closed-cell material which is suitable for use with the closure of this invention.

Figure 7:
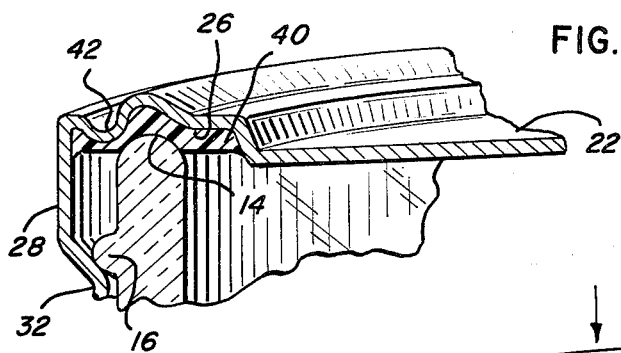
FIG. 7 is an enlarged cross-sectional view taken substantially along the line 7—7 of FIG. 5.
Figure 5:
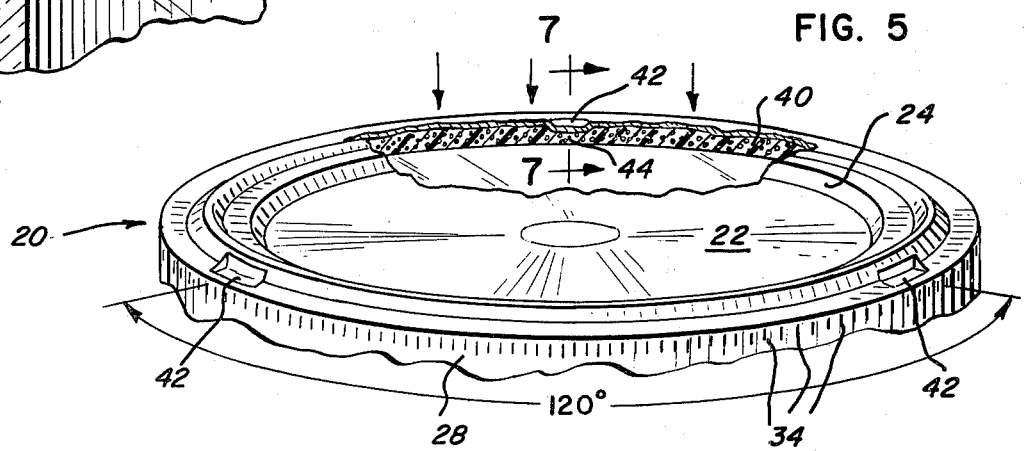
FIG. 5 is a fragmentary cross-sectional view, in perspective, at a location different from the section of FIGS. 1 to 4.
Figure 6:
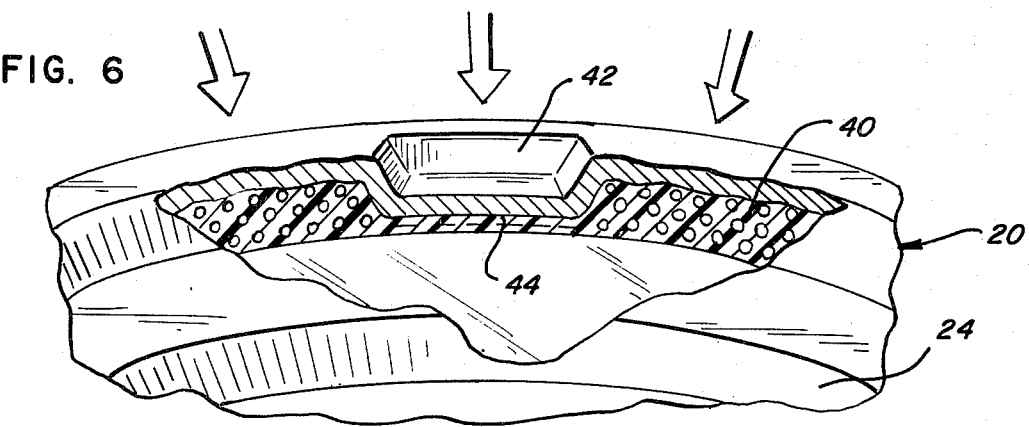
FIG. 6 is an enlarged fragmentary view of a portion of FIG. 5.

As best seen in FIGS. 5 to 7, a series of at least three projections or limitors 42 are provided. Limitors 42 which extend downwardly into the channel 26 are located so that they confront lip 14 of container 10. In the embodiment illustrated, there are three such limitors which are spaced equidistantly, i.e., about 120° from each other. As seen from FIGS. 5 to 7, the inner flat surfaces or land areas 44 of the limitors lie within the channel and are embedded in gasket 40. The land areas face the lip and are sufficiently expansive to prevent the limitors from cutting through the underlying gasket material as it is compressed against the lip 14. They do serve to assist in controlling the extent to which closure 20 may be tightened onto container 10. The thickness of the foam beneath the limitors is substantially less than the circumferentially spaced, but adjacent portions of the gasket 40.

Figure 2:
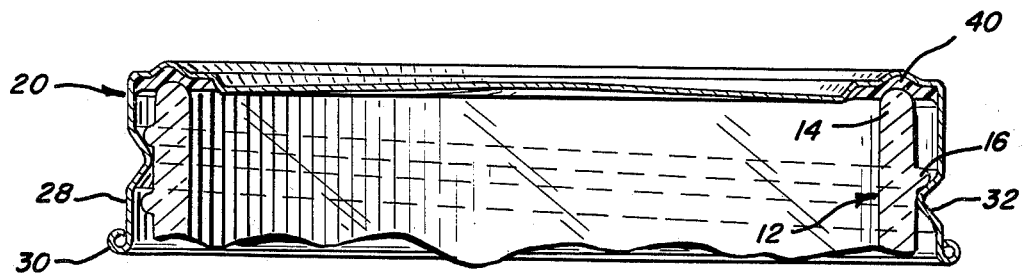
FIG. 2 is a cross-sectional view, similar to FIG. 1, showing the closure and container top sealingly secured to each other.
Figure 3:
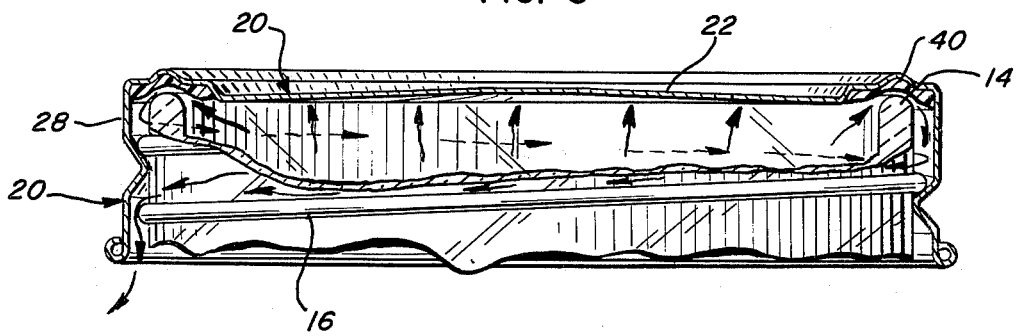
FIG. 3 is a cross-sectional view similar to FIG. 2, with the contents of the container under internal pressure.

When a closure 20 is to be sealingly secured to container 10, thereby to seal the contents C of the container therewithin, the container is first filled as desired. The closure 20 is then juxtaposed, as illustrated in FIG. 1, with the mouth 12 of the container 10 and is then screwed down, as illustrated by FIG. 2, until the gasket 40 sealingly engages the lip 14 around the entire lip. The degree to which the closure 20 may be tightened onto container 10 is in part controlled by limitors 42. When the closure is screwed down, it locally compresses the underlying foam portion more tightly than the circumferentially spaced foam material is compressed so that, under internal pressure, gases may vent under the gasket in the circumferentially spaced foam regions. When the closure has been sufficiently tightened, the contents C of the container are heated to safeguard them against spoilage. As the internal pressure increases, it reaches a level at which it acts against the resilient foam gasket to compress it, as illustrated by FIG. 3, thereby breaking the seal to vent gases, air and moisture, and to allow gases to escape from the container to the surrounding atmosphere. The presence of the limitors 42, which limit the compression of the foam gasket in lip areas spaced from the limitors, serves to control the degree of gasket compression, to make certain that internal pressure will compress the gasket, thereby to permit venting.

Figure 4:
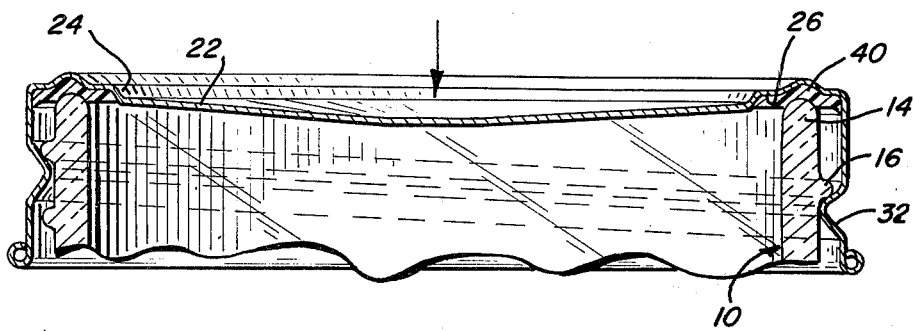
FIG. 4 is a cross-sectional view, similar to FIG. 3, with the contents of the container sealed under vacuum.

After heating has been completed and is discontinued, the internal container pressure decreases as the container cools. As this occurs, the gasket 42 will again engage lip 14, re-effecting the seal between the gasket and the lip, without further manipulation of the closure. As further cooling occurs, a vacuum is drawn and developed in the container. When a vacuum of approximately two to four inches of water is reached, the outwardly domed central cover or panel section 22 is pulled inwardly to the inverted domed position of FIG. 4. The movement of the central panel from the position of FIG. 3 to that of FIG. 4 is accompanied by an audible click. As long as vacuum is maintained within the container, the central panel will remain in the inverted, domed position of FIG. 4, thereby to provide a visual indication of maintenance of the vacuum. When the closure is unscrewed to gain access to the contents of the package, the gasket 40 will be moved away from its sealing engagement with lip 14. That will permit air to enter the container and will then permit the central panel 22 to return to the up position of FIG. 3. Of course, if the container is removed from storage and the closure is found to be domed upwardly, that serves as a visual indication that the contents may be spoiled and should not be used.

Comparative tests have been made on the widely used two-piece closure referred to above and the one-piece closure of this invention. Normally, when canning is done in pressure cookers, as it is frequently done, manufacturers recommend that the pressure cooker is allowed to cool gradually and for about one-half hour before it is opened to the atmosphere. However, too frequently, those who are doing the canning are impatient and open the pressure cooker too soon. With two-piece closures, when containers heated at 240°F. at 10 pounds pressure were promptly exposed to atmospheric pressure, about 50 percent of the gaskets blew out. However, when closures in accordance with this invention were used and containers were heated at 250°F. at 15 pounds pressure, upon comparable prompt exposure to atmospheric pressure with the consequent rapid decompression, no blow out of gaskets occurs.

With respect to the current two-piece closures, it is to be observed that when the contents of a sealed container are to be used and the container is to be opened, the peripheral closure portion must first be unscrewed and removed. That leaves the gasketed central cover panel in sealing engagement with the container. An implement must then be used to pry up the panel, thereby to break the seal with the gasket. This frequently damages or destroys the gasket, making the cover panel non-reusable. The closure of this invention is removable as a unit simply by unscrewing it, without extraneous implements and without damage to the gasket, thereby making it resuable.

It will be apparent that the one-piece closure of this invention provides a number of advantages. Although but one embodiment has been illustrated, those skilled in the art will appreciate the closure and the method of using it may take a variety of forms. Accordingly, I intend to be limited only insofar as the appended claims shall require.

What is claimed is:

1. A sealed package under vacuum comprising a container having a mouth, an upper circumferential sealing lip and a thread, a one-piece reusable closure sealingly secured to said container, said closure comprising a central cover section terminating outwardly in a depending peripheral flange, said flange providing a thread in threaded engagement with said container thread, an annular gasket bonded to said closure adjacent said flange, said gasket comprising closed-cell foam material resilient at temperatures up to about 250°F. and in sealing engagement with said lip around the entire lip, a portion of said closure central cover section being inwardly dished and being maintained in that inwardly dished configuration by internal vacuum in said sealed package, said central cover portion, when said closure is unscrewed to gain access to the contents of said package, springing preferentially to an outwardly dished configuration.

2. A sealed package in accordance with claim 1 wherein said closure defines a downwardly opening, annular channel adjacent said flange, and wherein said annular gasket is disposed in said annular channel.

3. A sealed package under vacuum comprising a container having a mouth, an upper circumferential sealing lip and a thread, and a one-piece reusable closure sealingly secured to said container, said closure comprising a central cover section terminating outwardly in a depending peripheral flange, said flange providing a thread in threaded engagement with said container thread, an annular gasket bonded to said closure adjacent said flange, said gasket comprising a closed-cell foam material resilient at temperatures up to about 250°F. and in sealing engagement with said lip around the entire lip, and limitor means embedded in said gasket material extending downwardly of said central cover section and locally compressing underlying portions of said foam gasket material against said lip more tightly than the gasket material which is circumferentially spaced from said limitor means is compressed against said lip.

4. A sealed package in accordance with claim 3 wherein said closure defines a downwardly opening, annular channel adjacent said flange, and said annular gasket is disposed in said annular channel, and wherein said limitor means are projections formed in said channel.

5. A sealed package in accordance with claim 3 wherein said limitor means comprise at least three spaced projections, each of said projections defining a flat surface embedded in said foam gasket material and facing said lip locally to compress said underlying portions of foam gasket material against said lip.

6. A sealed package in accordance with claim 3 wherein said closure defines an inwardly dished central cover portion which is spaced inwardly of said lip, said central cover portion being maintained in said inwardly dished configuration by internal vacuum in said sealed package and capable of springing preferentially to an outwardly dished configuration when said closure is unscrewed to gain access to the contents of said container.

7. A one-piece reusable closure for a container having a mouth, a thread, and an upper circumferential sealing lip, said closure comprising a central cover section, a depending peripheral flange providing thread means for threadingly engaging the thread of a container, and an annular gasket at the periphery of said central cover section, said gasket being bonded to said central cover section and comprising a closed-cell foam material resilient at temperatures up to about 250°F. for confronting a said sealing lip, and a portion of said central cover section being outwardly dished, but being movable under vacuum drawn against its lower surface to an inwardly dished configuration accompanied by an audible sound.

8. A one-piece closure in accordance with claim 7 further comprising limitor means, said limitor means being embedded in said foam material and projecting downwardly from the central cover section for confronting a said sealing lip, said gasket being of a thickness beneath said limitor means which is substantially less than the thickness at circumferentially spaced, but adjacent portions of said gasket.

9. The one-piece reusable closure in accordance with claim 7 wherein said closed-cell foamed material is a foamed plastisol.

10. A method of canning comprising the steps of: providing a container having a mouth, an upper circumferential sealing lip and a thread, providing a one-piece closure comprising a central cover section terminating outwardly in a depending peripheral threaded flange for threadingly engaging said container thread, and having an annular gasket bonded to said closure adjacent said flange, said gasket comprising closed-cell foam material for sealingly engaging said lip around the entire lip, and limitor means embedded in said gasket extending downwardly of said central cover section said central cover portion being dished outwardly, filling the container with a suitable quantity of product to be canned, threadingly securing said one-piece closure to said container with said gasket in sealing engagement with said lip and with said gasket material being compressed more tightly at the location of said limitor means than at other locations circumferentially spaced therefrom to thereby seal said product within said container together with a small volume of gas, then heating said container and said product contained therein to a temperature effective to prevent spoilage of said product and thereby generating pressure therein to force a portion of said contained gas to break the seal between the gasket and the container by compressing said gasket to vent said gas under said gasket to the surrounding atmosphere, then cooling said container and thereby re-effecting the seal between said gasket and said lip without further manipulation of said closure, thereby to allow a vacuum to develop in said container.

11. A method in accordance with claim 10 which includes drawing said central cover portion into a downwardly dished configuration while developing a vacuum in said container.

12. A method in accordance with claim 10 in which said one-piece closure is one which has previously been used to seal a container.

* * * * *